US012512498B2

(12) United States Patent
Waller et al.

(10) Patent No.: US 12,512,498 B2
(45) Date of Patent: Dec. 30, 2025

(54) METHOD FOR OPERATING AN SOFC FOR THE COMBINED PRODUCTION OF ELECTRICITY AND NITRIC OXIDE

(71) Applicant: Yara International ASA, Oslo (NO)

(72) Inventors: David Waller, Porsgrunn (NO); Egil Rasten, Porsgrunn (NO); Yngve Larring, Langhus (NO)

(73) Assignee: YARA INTERNATIONAL ASA, Oslo (NO)

( * ) Notice: Subject to any disclaimer, the term of this patent is extended or adjusted under 35 U.S.C. 154(b) by 485 days.

(21) Appl. No.: 18/014,624

(22) PCT Filed: Jul. 7, 2021

(86) PCT No.: PCT/EP2021/068752
§ 371 (c)(1),
(2) Date: Jan. 5, 2023

(87) PCT Pub. No.: WO2022/008559
PCT Pub. Date: Jan. 13, 2022

(65) Prior Publication Data
US 2023/0378507 A1  Nov. 23, 2023

(30) Foreign Application Priority Data
Jul. 7, 2020   (EP) ...................... 20184486

(51) Int. Cl.
| | |
|---|---|
| *H01M 8/126* | (2016.01) |
| *C01B 21/40* | (2006.01) |
| *H01M 4/88* | (2006.01) |
| *H01M 4/90* | (2006.01) |
| *H01M 8/04089* | (2016.01) |
| *H01M 8/06* | (2016.01) |
| *H01M 8/1253* | (2016.01) |
| *H01M 8/22* | (2006.01) |
| *H01M 8/2425* | (2016.01) |
| *H01M 8/12* | (2016.01) |

(52) U.S. Cl.
CPC ............ *H01M 8/126* (2013.01); *C01B 21/40* (2013.01); *H01M 4/8807* (2013.01); *H01M 4/9033* (2013.01); *H01M 8/04089* (2013.01); *H01M 8/06* (2013.01); *H01M 8/1253* (2013.01); *H01M 8/222* (2013.01); *H01M 8/2425* (2013.01); *H01M 2008/1293* (2013.01); *H01M 2300/0077* (2013.01)

(58) Field of Classification Search
CPC .... H01M 8/126; H01M 8/04089; H01M 8/06; H01M 8/1253; H01M 8/222; H01M 8/2425; H01M 4/8807; H01M 4/9033; H01M 2008/1293; H01M 2300/0077; C01B 21/40
See application file for complete search history.

(56) References Cited

U.S. PATENT DOCUMENTS

| | | | |
|---|---|---|---|
| 4,272,336 A | 6/1981 | Vayenas | |
| 9,666,891 B2 * | 5/2017 | Bierschenk | ......... H01M 4/8867 |
| 10,418,657 B2 * | 9/2019 | Liu | ...................... H01M 4/9025 |
| 2008/0248353 A1 | 10/2008 | Grieve | |
| 2011/0195342 A1 * | 8/2011 | Luo | ...................... C04B 35/6267 |
| | | | 429/495 |
| 2016/0079623 A1 | 3/2016 | Kim | |
| 2017/0062855 A1 | 3/2017 | Lim | |
| 2019/0284052 A1 | 9/2019 | Ostuni | |

FOREIGN PATENT DOCUMENTS

| | | |
|---|---|---|
| JP | 2017082670 A | 5/2017 |
| WO | 2020035521 A1 | 2/2020 |

OTHER PUBLICATIONS

Teague, C. E., the High Ammonia Fuel Cell, Massachusetts Institute of Technology, Jun. 1981, 103 pages.
Dekker, et al., Evaluation of Interconnect Alloys and Cathode Contact Coatings for SOFC Stacks, 6th European Solid Oxide Fuel Cell Forum, Jun. 28-Jul. 2, 2004, Lucerne (CH), 19 pages.
Cao, et al., An Efficient Oxygen Activation Route for Improved Ammonia Oxidation Through an Oxygen-Permeable Catalytic Membrane, ChemCatChem Communications, Mar. 18, 2014, vol. 6, Issue 5, pp. 1190-1194.
Hartley, A., et al., La0.6Sr0.4Co0.2Fe0.8O3 As the Anode and Cathode for Intermediate Temperature Solid Oxide Fuel Cells, Elsevier, Catalysis Today 55 (2000) pp. 197-204.
Jamale, et al., Journal of Materials Science. Materials in Electronics, 2016, vol. 27, No. 1, pp. 795-799.
Lai, et al., Journal of Power Sources, 2011, vol. 196, No. 4, pp. 1826-1832.

(Continued)

*Primary Examiner* — Raymond Alejandro
(74) *Attorney, Agent, or Firm* — DILWORTH IP, LLC

(57) ABSTRACT

A method for the combined production of electricity and nitric oxide, comprising the steps of: providing an SOFC comprising an anodic side comprising a solid gas-permeable anode, a gas inlet and a gas outlet, a cathodic side comprising a solid gas-permeable cathode and a gas inlet and a gas outlet, and a fully dense solid electrolyte, separating the cathodic side from the anodic side; introducing an oxygen-containing gas in the inlet of the cathodic side of the SOFC; introducing an ammonia-containing gas stream in the inlet of the anodic side of the SOFC; collecting nitric oxide at the outlet of the anodic side and collecting a current flowing between the anodic side and the cathodic side.

14 Claims, 3 Drawing Sheets

(56) References Cited

OTHER PUBLICATIONS

Xu, et al., Journal of Materials Science & Technology, 2017, vol. 33, No. 11, pp. 1329-1333.
Lu, et al., Electrochimica Acta, 2019, vol. 323, p. 134857.
Hansen, The SOC4NH3 Project. Production and use of Ammonia by Solid Oxide Cells.
International Search Report and Written Opinion issued in App. No. PCT/EP2021/068752, mailing date Oct. 28, 2021, 16 pages.
International Preliminary Report on Patentability issued in App. No. PCT/EP2021/068752, mailing date May 18, 2022, 16 pages.

* cited by examiner

METHOD FOR OPERATING AN SOFC FOR THE COMBINED PRODUCTION OF ELECTRICITY AND NITRIC OXIDE

FIELD OF THE INVENTION

The invention relates to the field of solid oxide fuel cells for the combined production of electricity and nitric oxide and to the integration of the related applications of nitric acid production, water electrolysis and air separation.

BACKGROUND

A Solid Oxide Fuel Cell (SOFC) is a high temperature device that is a means of converting chemical energy directly into electrical energy. The SOFC consists of a fully dense ceramic electrolyte membrane that is able to transport ions; most typically oxygen ions ($O^{2-}$), when a partial pressure gradient of the transported species is applied thereon. For a membrane transporting oxygen ions, such a gradient is created when the membrane comprises, for example, air on one side of the membrane and a gas, low in oxygen, on the other side. In the SOFC, the low oxygen partial pressure originates from a fuel gas that is oxidized by oxygen ions transported through the membrane, as shown schematically in FIG. 1.

At the high oxygen partial pressure side of the membrane, oxygen molecules are reduced to oxygen ions and incorporated into the electrolyte membrane.

$$O_2 + 4e^- \rightarrow 2O^{2-}$$

The oxygen partial pressure gradient across the membrane drives the oxygen ions to the fuel side, via oxygen ion vacancies in the crystal lattice of the electrolyte membrane. When reaching the surface of the fuel side of the membrane, the oxygen ions react with the fuel gas. Many fuel gasses can be oxidized, such as hydrogen, carbon oxide, methane and ammonia, and the corresponding reaction examples are shown below:

$$H_2 + O^{2-} \rightarrow H_2O + 2e^-$$

$$CO + O^{2-} \rightarrow CO_2 + 2e^-$$

$$2\,CH_4 + 8\,O^{2-} \rightarrow 4\,H_2O + 2CO_2 + 16e^-$$

$$2\,NH_3 + 3/2\,O^{2-} \rightarrow 3/2\,H_2O + N_2 + 3e^-$$

From the above reactions, it can be seen that the oxidation of the fuel gas by the transported oxygen ions results in the release of electrons. To have a process in which the oxygen and fuel surfaces do not become polarized, thus stopping the transport of the oxygen ions, the electrons from the fuel side need to be transported to the oxygen side. The electrolyte transports oxygen ions, but it is an electrical insulator, so electrons cannot pass through the electrolyte. However, upon using suitable electrodes on each of the oxygen and fuel surface—that is an anode at the fuel surface and a cathode at the oxygen surface—and an electrical connection between them, an electrical current flows from the anode to the cathode. The driving force is an electrical potential—that is a voltage-generated by the difference in the oxygen concentrations across the membrane, according to the formula below and an electrical power is generated according to the formula below:

$$E_{SOFC} = \frac{E_{max} - i_{max} \cdot \eta_f \cdot r_1}{\frac{r_1}{r_2} \cdot (1 - \eta_f) + 1}$$

wherein E is the SOFC voltage (V), $E_{max}$ is the maximum voltage (V) given by the Nernst equation, $i_{max}$ is the maximum current density (for a given fuel flow), $\eta_f$ is the fuel utilization factor, and $r_1$ and $r_2$ are the ionic and electric specific resistance of the electrolyte, respectively. This equation was validated and found to be suitable for optimization and sensitivity studies in plant-level modelling of various systems with SOFC's.

In order to obtain a high flux of oxygen through the membrane, and hence a high electrical current, the electrolyte and electrodes are heated to low temperatures ranging from about 400° C. to about 500° C., or to intermediate temperatures ranging from about 500° C. to about 750° C. or to high temperatures ranging from about 750° C. to about 1000° C.

The electrodes in the SOFC should demonstrate several functions. Firstly, they should demonstrate good electrical conductivity under the operating conditions, in particular a high temperature, and a high oxygen partial pressure at the cathode and a low oxygen partial pressure at the anode, when the SOFC comprises an oxygen ion conducting electrolyte. They further should demonstrate a good thermal expansion match with the chosen electrolyte. Also, they should not form insulating or resistive reaction products with the electrolyte. Moreover, they should not melt, or evaporate too much under the operating conditions and afford sufficient stability such that they do not have to be replaced too frequently, in order to minimize the operating costs. The electrodes should be Mixed Ionic and Electronic Conductors (MIEC)—that is they should conduct both oxygen ions in an oxygen ions conducting membrane or protons in a proton electrolyte membrane and electrons.

As regard to the anode, the anode should be a good oxidation catalyst.

SOFCs based on both zirconia and ceria electrolytes typically use a nickel-based composite anode, with the second phase being yttria-stabilized zirconia (YSZ) or cerium oxide doped with gadolinium (CGO). The metallic nickel provides electrical conductivity and the YSZ or CGO provides some ionic conductivity.

Two other components of the flat plate SOFC are the interconnect plates and current collectors. These components are especially important in view of mounting SOFCs together such as to obtain a stack of SOFCs. The interconnect plates and current collectors, along with anodes, cathodes and electrolytes are shown in a schematic drawing of an SOFC, as depicted in FIG. 2. The interconnect, like the cathode and anode electrodes require a good thermal expansion match with the chosen electrolyte.

The interconnects are gas tight, electrically conducting plates that separate and direct the oxygen and fuel gas flows. For high temperature operation (>900° C.), these are comprised of an electrically conducting ceramic, such as $La_{1-x}Sr_xCrO_3$. A driver for developing electrolytes with high oxygen transport and thin film electrolytes is to allow operation at temperatures where metallic interconnects could be used. To ensure a particularly good electrical contact between the electrodes and the interconnects, a current collector, consisting of a metal mesh or net is most often used.

An SOFC, working on pure hydrogen as fuel and air as oxidant, might have a yield of about 60% and may exhibit peak power densities as high as 2 W/cm², and may be operated at from 400° C. to 500° C. (Minh, *High Temperature Solid Oxide Fuel Cells for the 21st Century*, 2016).

A number of these basic SOFC-units can be mounted together to produce a stack, as shown schematically in FIG. 3; 50 to 100 not being unusual A large SOFC system is modular and consisting of many individual stacks. Each stack may generate up to a few kW of power. The largest SOFC modules are currently generating about 300 kW.

It is known to use ammonia as a fuel in an SOFC. As a fuel, it has some positive aspects. Compared to a hydrocarbon fuel, it requires little treatment, such as purification, reforming or humidification. There is no risk of carbon deposition on the anode, as with hydrocarbons. When operated in a typical SOFC, with nickel-based anodes, it gives a similar electrical power output as an SOFC operated with hydrogen as fuel, because the ammonia is cracked into hydrogen and nitrogen over the nickel-based anode, before it is oxidised. In effect, a standard ammonia SOFC is a hydrogen SOFC because of the ammonia cracking of ammonia into nitrogen and hydrogen (Dekker & Rietveld, 6th SOFC Forum, 28 Jun.-2 Jul. 2004, Lucerne (CH)). This cracking reaction is so effective that the standard ammonia SOFC is considered to be a power generation system generating a low amount of nitrogen oxides.

If the three possible products from the oxidation of ammonia are considered, namely nitrogen, dinitrogen oxide and nitric oxide according to the following reactions:

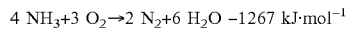
$$4\ NH_3 + 3\ O_2 \rightarrow 2\ N_2 + 6\ H_2O\ -1267\ kJ \cdot mol^{-1}$$

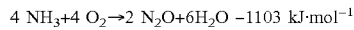
$$4\ NH_3 + 4\ O_2 \rightarrow 2\ N_2O + 6\ H_2O\ -1103\ kJ \cdot mol^{-1}$$

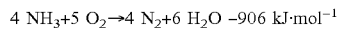
$$4\ NH_3 + 5\ O_2 \rightarrow 4\ N_2 + 6\ H_2O\ -906\ kJ \cdot mol^{-1}$$

it can be concluded that nitrogen is the most thermodynamically favourable product, so if the aim of the SOFC is to produce maximum power, nitrogen is the desired product of ammonia oxidation. However, to produce nitric acid, the selective oxidation of ammonia to nitric oxide is required. This means that thermal cracking of ammonia into nitrogen and hydrogen on its delivery to the SOFC must be avoided, as well as catalytic cracking of the ammonia over the anodes. Essentially, a new anode must be designed to direct the oxidation of ammonia to nitric oxide, rather than to nitrogen or to nitrous oxide.

BACKGROUND PRIOR ART

U.S. Pat. No. 4,272,336 (Massachusetts Institute of Technology) discloses methods and devices for forming nitric oxide (NO) from ammonia ($NH_3$) by means of electrolytic cells while directly recovering electrical energy. It teaches that typical oxygen ion-conducting solid electrolytes are solid solutions formed between oxides containing divalent and trivalent cations such as CaO, $Sc_2O_3$, $Y_2O_3$, $La_2O_3$ or the like with oxides containing tetravalent cations such as $ZrO_2$, $ThO_2$, and $CeO_2$. Noble metal catalysts, such as Pt, are suggested as electrodes. No indication is provided regarding the achieved conversion of ammonia to nitric oxide in U.S. Pat. No. 4,272,336. An about 24% conversion of ammonia to nitric oxide was achieved at a corresponding power density of about 0.2 mW/cm² in C. E. Teague, *The High Ammonia Fuel Cell*, Massachusetts Institute of technology, 1981, p 39.

Dekker & Rietveld (6th SOFC Forum, 28 Jun.-2 Jul. 2004, Lucerne (CH), p. 1524) discloses oxidizing ammonia to $N_2$ by means of an SOFC, with only a minute amount of nitrogen oxides produced as a by-product. Lanthanum Strontium Manganite (LSM) was used as a cathode, but not as an anode: the anode was a nickel-containing, Ni/YSZ composite anode.

US 20160079623 (Korea Institute of Industrial Technology) is directed to methods for preparing a solid electrolyte material for SOFC's. Hydrogen is used as a fuel. It mentions SOFC's comprising a NiO/YSZ anode, a solid electrolyte (YSZ), and an LSM/YSZ cathode. US20160079623 suggests replacing the YSZ with a high ion conductive solid electrolyte material. Ytterbium Scandium-Stabilized Zirconia (YbScSZ) is specifically suggested as an alternative solid electrolyte material.

Cao et al. (*ChemCatChem* 94, 6, p. 1190-1194, 2014) discloses using a fully dense mixed-conducting Lanthanum Strontium Cobalt Ferrite (LSCF) membrane for oxidizing ammonia to NO. As electrons are transported from the fuel side or the membrane to the air side internally, no electricity is generated in the disclosure according to Cao et. al.

US 2017/062855 (Kceracell Co. Ltd.) discloses an SOFC comprising a ceria electrolyte. The ceria electrolyte comprises either gadolinium (Gd) or samarium (Sm), which is co-doped with ytterbium (Yb) and bismuth (Bi), and exhibits low-temperature sintering properties. LSCF is disclosed to be a common cathode material and is a MIEC. The ceria electrolyte is specifically used as a buffer layer between a zirconia electrolyte and a MIEC electrode. Ceria-based electrolytes are commonly used in combination with MIEC cathode materials such as LSCF because they do not react with MIEC cathodes, as opposed to zirconia electrolytes. In particular, a ceria-based electrolyte (Gd- or Sm-doped $CeO_2$) comprising $CeO_2$ and 5 to 10 mol % of $Gd_2O_3$ or $Sm_2O_3$ has high oxygen ionic conductivity and does not react with MIEC cathodes, such as LSCF, and is thereby widely utilized as a material for a buffer layer, which is interposed between the zirconia ($ZrO_2$)-based electrolyte membrane of the SOFC and the MIEC cathode layer. An SOFC comprising a samarium-doped ceria electrolyte is specifically disclosed.

Hartley et al. (Catalysis Today 55 (2000) p. 197-204) discloses the catalytic activity towards methane oxidation, and susceptibility to deactivation through carbon deposition, comparing the perovskite material $La_{0.6}Sr_{0.4}Co_{0.2}Fe_{0.8}O_3$ (LSCF-6428), used as both the anode and cathode, with the conventional Ni/YSZ anode material.

Jamale et al (Journal of Materials Science. Materials in Electronics, 2016, vol. 27, no. 1, pages 795-799) discloses the fabrication and characterization of $La_{0.6}Sr_{0.4}Co_{0.2}Fe_{0.8}O_{3-\delta}$(LSCF)-$Ce_{0.9}Gd_{0.1}O_{1.95}$ (GDC) composite thick film for anode supported solid oxide fuel cells.

Lai et al (Journal of Power Sources, 2011, vol. 196, no. 4, pages 1826-1832) discloses a nanostructured $La_{0.6}Sr_{0.4}Co_{0.8}Fe_{0.2}O_3$/$Y_{0.08}Zr_{0.92}O_{1.96}$/$La_{0.6}Sr_{0.4}Co_{0.8}Fe_{0.2}O_3$ (LSCF/YSZ/LSCF) symmetric thin film solid oxide fuel cells.

Xu et al (Journal of Materials Science & Technology, 2017, vol. 33, no. 11, pages 1329-1333) discloses the fabrication and optimization of $La_{0.4}Sr_{0.6}Co_{0.2}Fe_{0.7}Nb_{0.7}O_{3-\delta}$ electrode for symmetric solid oxide fuel cell with zirconia based electrolyte.

Lu et al (Electrochimica Acta, 2019, vol. 323, p. 134857) discloses the efficient and stable symmetrical electrode $La_{0.6}Sr_{0.4}Co_{0.2}Fe_{0.7}Mo_{0.1}O_{3-\delta}$ for direct hydrocarbon solid oxide fuel cells.

JP 2017 082670 A relates to an internal combustion engine including an engine operated by burning a hydrocarbon fuel, combustion means for burning combustibles in the exhaust gas to an exhaust gas flow path through which exhaust gas generated from the engine flows, and nitrogen oxidation for removing nitrogen oxides.

US2019/284052 discloses a process for nitric acid production and comprising a synthesis of ammonia by catalytic conversion of a make-up gas comprising hydrogen and nitrogen in an ammonia synthesis loop, wherein tail gas is used as nitrogen source for obtaining said make-up gas.

WO2020/035521A1 discloses novel concept for a high energy and material efficient nitric acid production process and system is provided, wherein the nitric acid production process and system, particularly integrated with an ammonia production process and system, is configured to recover a high amount of energy out of the ammonia that it is consuming, particularly in the form of electricity, while maintaining a high nitric acid recovery in the conversion of ammonia to nitric acid. It does not disclose a solid oxide fuel cell (SOFC).

LIST OF FIGURES

Figure 1:
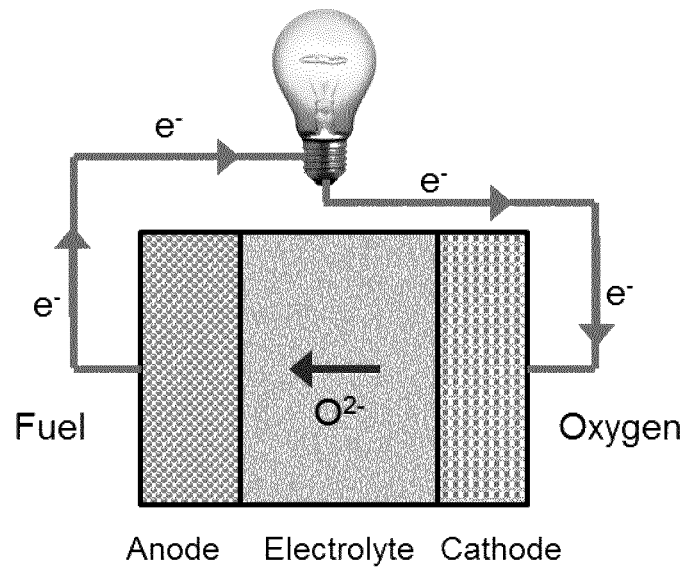
FIG. 1 shows a schematic representation of an SOFC
Figure 2:
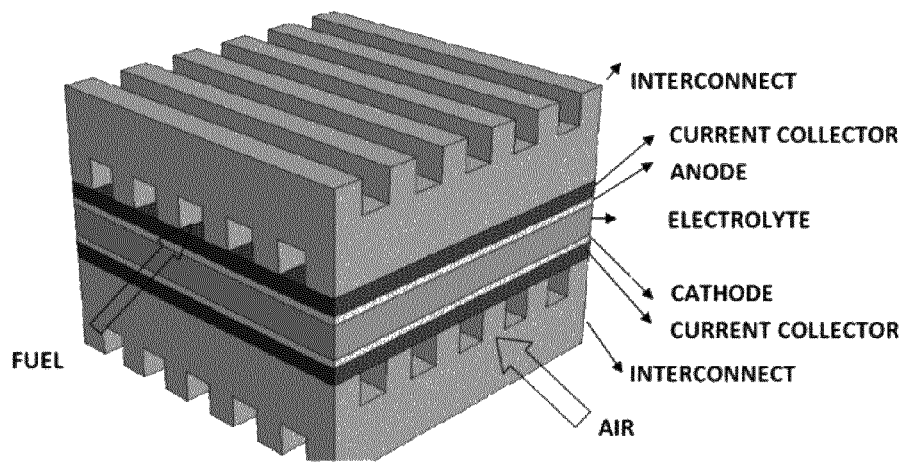
FIG. 2 shows an SOFC unit that can be repeated to form a stack of SOFCs.
Figure 3:
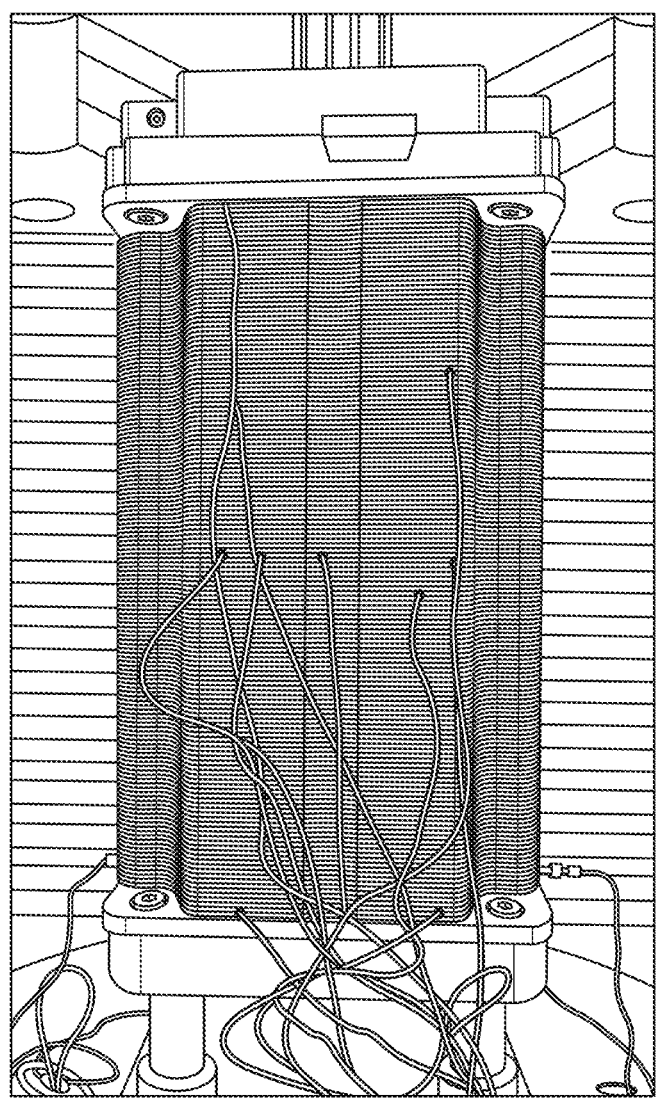
Figure 4:
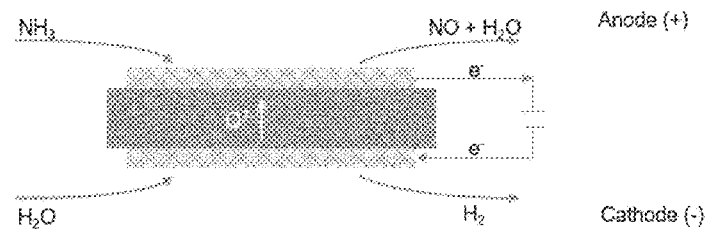
Figure 5:
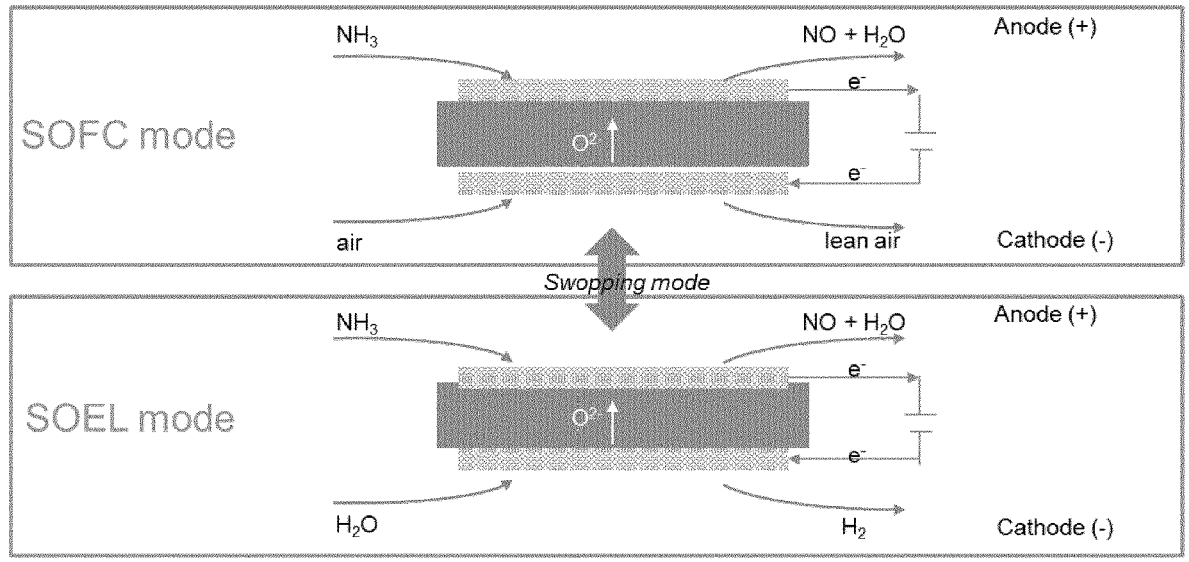

FIG. 3: shows a stack of SOFCs;

FIG. 4: shows a schematic representation of the embodiment of the method of the disclosure in which steam is introduced in the cathodic side;

FIG. 5: shows a schematic representation of the embodiment of the method of the disclosure in which the SOFC is alternatively operated in an oxygen-consuming mode (SOFC-mode) using air and as a water electrolyser (SOEL-mode) using steam.

Figure 6:
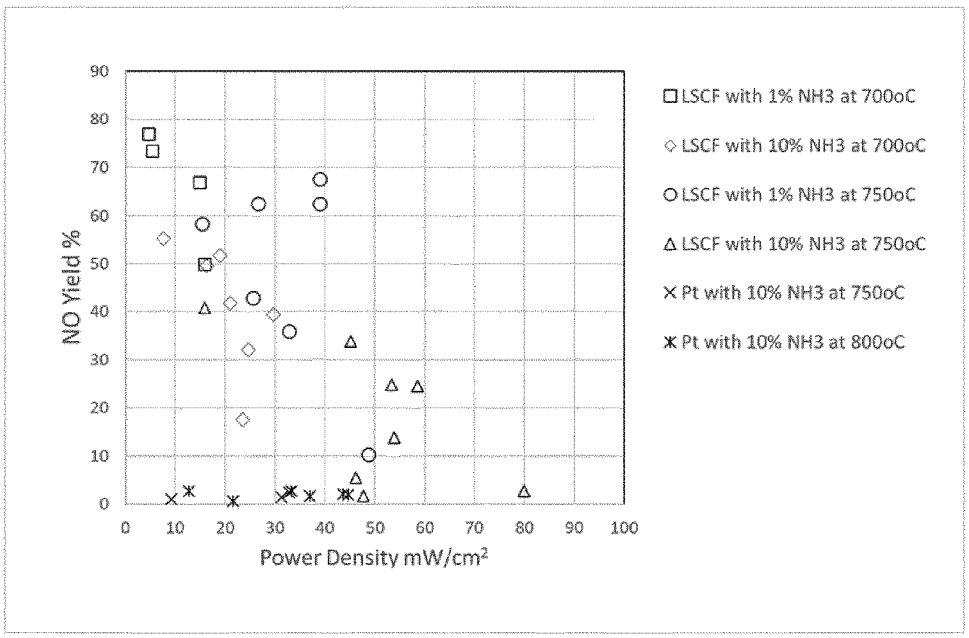

FIG. 6: represents the nitric oxide yield in function of power density for different anode materials.

SUMMARY OF THE INVENTION

According to a first aspect of the disclosure, a method is disclosed for operating an SOFC for the combined production of electricity and substantial amounts of nitric oxide (NO). The method comprises the steps of
a) providing an SOFC comprising an anodic side comprising a solid gas-permeable anode, a gas inlet and a gas outlet, a cathodic side comprising a solid gas-permeable cathode and a gas inlet and a gas outlet, and a fully dense solid electrolyte, separating the cathodic side from the anodic side;
b) introducing an oxygen-containing gas in the inlet of the cathodic side of the SOFC;
c) introducing an ammonia-containing gas stream in the inlet of the anodic side of the SOFC;
d) collecting nitric oxide at the outlet of the anodic side; and
e) collecting a current flowing between the anodic side and the cathodic side;
wherein the method is performed at a temperature ranging from 500 to 800° C., and wherein the anode comprises a composition $A_{1-X}A'_{X}B_{1-Y}B'_{Y}O_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3, and wherein the cathode comprises a composition $A_{1-X}A'_{X}B_{1-Y}B'_{Y}O_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3.

According to a second aspect of the disclosure, an SOFC for the combined production of electricity and substantial amounts of nitric oxide (NO) is disclosed. The SOFC comprises:
an anodic side comprising a solid gas-permeable anode, a gas inlet and a gas outlet;
a source of ammonia gas in fluid communication with or connected to the gas inlet at the anodic side;
a cathodic side comprising a solid gas-permeable cathode, a gas inlet and a gas outlet;
a fully dense electrolyte, separating the anodic side from the cathodic side, in particular with a composition selected from
(a) $Ce_{1-X}Gd_{X}O_{2-\delta}$ wherein X ranges from 0.1 to 0.2 and wherein $\delta$ ranges from 0.05 to 0.1, and
(b) $Zr_{1-(X+Y)}Sc_{X}M_{Y}O_{2-\delta}$, wherein M is Al, Yb, Ce, wherein x ranges from 0.03 to 0.2 and wherein Y ranges from 0.001 to 0.01 and wherein $\delta$ ranges from 0.01 to 0.06;
means for heating the SOFC to a temperature ranging from 550 to 800° C.; and
means for collecting a current flowing between the anodic side and the cathodic side;

The anode comprises a composition $A_{1-X}A'_{X}B_{1-Y}B'_{Y}O_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3. The cathode comprises a composition $A_{1-X}A'_{X}B_{1-Y}B'_{Y}O_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3.

According to a third aspect of the disclosure, a stack of SOFCs comprising at least two or more of the SOFCs according to the disclosure, is disclosed.

According to a fourth aspect of the disclosure, a system for the production of nitric acid is disclosed. The system comprises:
a Haber-Bosch unit comprising an outlet for delivering ammonia produced by the unit;
means for heating the ammonia produced by the Haber-Bosch unit to a temperature ranging from 500 to 800° C., such that ammonia is collected in a gaseous state at an outlet of the means for heating;
a stack of SOFCs according to the disclosure, wherein the inlets of the anodic sides of the cells are in fluid connection with the outlet of the means for heating;

means for transferring the nitric oxide (NO) delivered at the outlets of the anodic sides of the cells of the stack, to an oxidizing section of a nitric acid production unit being either supplied with an oxygen-containing gas or comprising an ammonia oxidation catalyst, wherein nitric oxide is oxidized to nitrogen oxide gases, in particular nitrogen dioxide and dinitrogen tetroxide; and means for transferring the nitrogen oxide gases to a nitric acid absorption tower, wherein the nitrogen oxide gases are absorbed into an aqueous solution, thereby producing nitric acid.

According to a fifth aspect, a method for producing nitric acid is disclosed. The method comprises the consecutive steps of:

a) producing ammonia in a Haber-Bosch unit;
b) collecting the produced ammonia at an outlet of the Haber-Bosch unit;
c) heating the ammonia produced by the Haber-Bosch unit to a temperature ranging from 500 to 800° C. such that ammonia is collected in a gaseous state at an outlet of the means for heating;
d) transferring ammonia to the inlet of the anodic side of an SOFC of the present disclosure, in particular to the inlet of the anodic sides of the cells of the stack of SOFCs of the disclosure;
e) producing nitric oxide (NO) according to the method of the disclosure for the combined production of electricity and nitric oxide;
f) collecting the produced nitric oxide at the outlet of an SOFC of the present disclosure, in particular at the outlets of the anodic sides of the cells of the stack;
g) transferring the produced nitric oxide to an oxidizing section of a nitric acid production unit being either supplied with an oxygen-containing gas or comprising an ammonia oxidation catalyst;
h) oxidizing nitric oxide to nitrogen oxide gases, in particular nitrogen dioxide and dinitrogen tetroxide;
i) transferring the nitrogen oxide gases to an absorption section of a nitric acid production unit; and
j) absorbing the nitrogen oxide gases into an aqueous solution to produce nitric acid.

According to a sixth aspect of the disclosure, the use of the SOFC according to the disclosure, or the stack of SOFCs according to the disclosure, for the combined production of electricity and substantial amounts of nitric oxide (NO), is disclosed.

According to a seventh aspect of the disclosure, the use of an anode comprising a composition $A_{1-X}A'_{X}B_{1-Y}B'_{Y}O_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1, and $\delta$ ranges from 0.025 to 0.3, in the SOFC according to the disclosure, in the stack of SOFC's according to the disclosure, in the system according to the disclosure for the production of nitric acid, in the method for the combined production of electricity and nitric oxide according to the disclosure, or in the method for producing nitric acid according to the disclosure, is disclosed.

DETAILED DESCRIPTION

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The terms "ranges from . . . to . . . " or "from . . . to . . . " or between, as used when referring to a range for a measurable value, such as a parameter, an amount, a time period, and the like, is intended to include the limits associated to the range that is disclosed.

As defined herein, an aqueous solution is selected from the group consisting of water, or up to 0.5 weight % nitric acid in water, or up to 1 weight % ammonium nitrate in water or combinations thereof.

As defined herein, air is a mixture of gases comprising about 78 volume % nitrogen and about 21 volume % oxygen, further comprising about 0.9 volume % argon, about 0,04 volume % carbon dioxide and small amounts of other gases. Air typically also contains some water vapour.

According to a first aspect of the disclosure, a method is disclosed for operating a solid oxide fuel cell for the combined production of electricity and substantial amounts of nitric oxide (NO). The method comprises the steps of a) providing an SOFC comprising an anodic side comprising a solid gas-permeable anode, a gas inlet and a gas outlet, a cathodic side comprising a solid gas-permeable cathode and a gas inlet and a gas outlet, and a fully dense solid electrolyte, separating the cathodic side from the anodic side; b) introducing an oxygen-containing gas in the inlet of the cathodic side of the SOFC; c) introducing an ammonia-containing gas stream in the inlet of the anodic side of the SOFC; d) removing a gas stream comprising substantial amounts of nitric oxide at the outlet of the anodic side, or collecting nitric oxide, particularly a nitric oxide containing gas stream, at the outlet of the anodic side; and e) collecting a current flowing between the anodic side and the cathodic side. An advantage in using ammonia as a fuel is that it is a clean fuel: unlike other fuels, such as hydrocarbon fuels, no deposition of carbon is observed in the process of oxidizing the fuel and no carbon dioxide is produced which limits the greenhouse gas emissions resulting from the process. Potential ammonia-containing gases include but are not limited to pure ammonia gas, or a mixture of ammonia gas and steam, or a mixture of ammonia gas and an inert gas such as nitrogen or argon, or a mixture of ammonia gas and several inert gases, or a mixture of ammonia gas, steam and one or more inert gas. It is understood that, depending on the composition of the ammonia-containing gas, along with nitric oxide, steam and/or other inert gases, as well as the ammonia gas not converted to nitric oxide, may be collected at the outlet of the anodic side.

The method is performed at a temperature ranging from 500 to 800° C. The cathode comprises a material suitable for reducing oxygen. The anode comprises a composition $A_{1-X}A'_XB_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, a first variable X ranges from 0.05 to 0.6 and in particular from 0.1 to 0.4, a first variable Y ranges from 0 to 1 and a first variable $\delta$ ranges from 0.025 to 0.3. In particular, A is La.

Surprisingly, the inventors have found that at least 80% conversion of ammonia to nitric oxide can be achieved by applying the method of the disclosure. In addition, the method of the disclosure allows for the operation of the SOFC at a resistance as low as 1 $\Omega \cdot cm^{-2}$, meaning that the oxygen ions are effectively transported from the cathode to the anode and the ammonia is effectively converted into nitric oxide. When the resistance is as high as ranging from 10 to 15 $\Omega \cdot cm^{-2}$, it is possible to supply additional power in order to increase the transport of the oxygen ions from the cathode to the anode in order to achieve at least 80% conversion of ammonia to nitric oxide. The person skilled in the art can, accordingly, optionally supply additional power to the cell.

The anode comprises a perovskite composition with the general formula $A_{1-X}A'_XB_{1-Y}B'_YO_{3-\delta}$, are large cations. A is selected from the group consisting of La, Y, Sm, Pr, Nd and Gd and A' is selected from the group consisting of La, Ca, Sr or Ba. In particular, A is La and the stability of the anode is increased as the reduction potential of the perovskite composition comprised in the anode is reduced, thereby promoting the transport of oxygen ions through the composition and, hence, the conversion of ammonia to nitric oxide. B and B' are smaller cations. B and B' are each independently selected from the group consisting of Co, Fe, Mn, Cr and V or mixtures thereof.

The oxidation state of the A, A', B and B' cations have an effect on the electronic structure of the perovskite and, therefore, on the ionic and electronic properties of the SOFC used in the method of the disclosure. In order to retain a neutral charge, decreasing the oxidation state of A' may result, for example, in the increase of the oxidation state of B or in the reduction of oxygen ion vacancies in the composition, resulting in decreased ionic conductivity.

It has been found that increasing the value of the first variable X in the above perovskite structure increases the oxygen vacancy concentration, which can increase oxygen ion mobility; this increase in ionic conductivity is a positive effect to be considered when considering the composition of the perovskite. However, increasing the value of X also reduces the stability of the perovskite composition towards reduction. Therefore, X ranges from 0.05 to 0.6 and in particular from 0.1 to 0.4, in order to achieve optimal ionic and electrical conductivity but, at the same time, sufficient stability of the perovskite composition.

B and B' are each independently selected from the group consisting of Co, Fe, Mn, Cr and V or mixtures thereof. It has been found that an increase in the amount of Co and Fe will result in increased ionic conductivity, however also in decreased stability towards reduction of the perovskite composition. By substituting part of Co and/or Fe for Cr, Mn, V or a combination thereof, the stability of the perovskite composition is increased. By increasing the content in Co and/or and/or Mn and/or Cr, the electrical conductivity may increase.

The ionic conductivity is increased by increasing the gradient of the oxygen partial pressure between the anode and the cathode. Hence, the richer in oxygen the oxygen-containing gas that is introduced at the inlet of the cathode is, the higher the electrical conductivity is.

In particular, the cathode comprises a composition $A_{1-X}A'_XB_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3. In particular, A' is Sr and Ca in order to reduce the reaction of the cathode with the oxygen-containing gas introduced in the inlet of the cathodic side.

According to one embodiment of the method of the disclosure, nitric oxide represents at least 10% by weight, preferably from 10 to 80%, of the product or gas stream collected or removed at the outlet of the anodic side.

According to one embodiment of the method of the disclosure, the method is performed at a temperature ranges from 700 to 750° C.

According to one embodiment of the method of the disclosure for the combined production of electricity and nitric oxide, the anode and the cathode comprise a composition $La_{0.60}Sr_{0.40}Co_{0.20}Fe_{0.80}O_3$. It has been found that, by using this specific perovskite composition, 76% conversion of ammonia to nitric oxide was achieved which compares with only 5% achieved with the state of the art Pt anode and cathode. In addition, at a temperature of 750° C., a power density of 80 $mW/cm^2$ can be generated. In addition, identical anode and cathode perovskite compositions reduces the operational costs by reducing the number of elements in the cell, thereby simplifying the cell.

According to one embodiment of the method of the disclosure for the combined production of electricity and nitric oxide, the oxygen-containing gas is air, steam, oxygen, or a mixture of nitrogen and oxygen. By introducing air or a mixture of nitrogen and oxygen, following reduction in the cathodic side, a gas with a reduced oxygen content is obtained that can be fed to an air separation unit where the air is separated into its main components nitrogen and oxygen; as the oxygen content of the gas being fed to the air separation unit is reduced, less work will be required from the air separation unit to separate oxygen gas from nitrogen gas.

According to one embodiment of the method of the disclosure for the combined production of electricity and nitric oxide, the method is performed at a temperature ranging from 500 to 750° C. and wherein the electrolyte is a ceria-based electrolyte. The advantage of operating at such intermediate temperatures is that the stability of the perovskite composition is increased and, hence, the costs associated with maintaining the anode are reduced. There are several benefits of operating the cell in the low range of 350 to 500° C. or in the intermediate range of 500 to 750° C. A first benefit is that lower costs materials, rather than specialty alloys, such as stainless steels can be used. In addition, the stability of the electrodes is increased. Furthermore, at lower temperatures, the thermal expansion of the electrolyte shall be reduced, and the formation resistive interfacial layers between the electrolyte and the electrodes and the electrodes and the interconnects shall be reduced. Finally, operating in the lower temperature range allows to the use of a cheap ceria based electrolyte. In particular, the composition of the electrolyte is $Ce_{1-X}Gd_XO_{2-\delta}$ wherein a second variable X ranges from 0.1 to 0.2 and wherein a second variable $\delta$ ranges from 0.05 to 0.1. This ceria electrolyte is particularly suitable at cell operating temperatures ranging from 500 to 750° C., as at higher temperatures some electrical conductivity can occur, reducing cell efficiency.

According to one embodiment of the method of the disclosure for the combined production of electricity and nitric oxide, the method is performed at a temperature ranging from 750 to 800° C. and the electrolyte is a zirconia-based electrolyte. The oxygen ion conductivity in the electrolyte increases with increasing temperature, hence the electrode resistance decreases, which results in additional power being generated.

In particular, the composition of the electrolyte is $Zr_{1-(X+Y)}Sc_XM_YO_{2-\delta}$, wherein M is Al, Yb, Ce, wherein a third variable X ranges from 0.03 to 0.2 and wherein a second variable Y ranges from 0.001 to 0.01 and wherein a third variable $\delta$ ranges from 0.01 to 0.06. Such electrolyte offers satisfactory oxygen ions transport and is particularly suitable at higher temperatures ranging from 750 to 800° C. The codopant M is added in order to suppress the cubic to rhombohedral phase transition that occurs at temperatures from 750 to 900° C. and cause mechanical instability and a reduction in ionic conductivity. In particular, the electrolyte is a 50 to 200 microns self-supporting membrane on the cathode or the anode. As oxygen transport through the electrolyte is directly related to the oxygen potential gradient, the oxygen flux is increased by having a thinner membrane. In particular, a self-supporting electrolyte film has a thickness of 100 to 150 μm and is supported on a cathode or a anode with a thickness of approximately 20 to 50 μm. In particular, the thin membrane electrolyte is supported on the cathode.

An alternative for the anode or cathode thickness is a thickness of above 500 μm, so that it can act as a physical support for a thin film electrolyte having a thickness ranging from 5 to 30 μm. The cost of the rare scandium, Sc, element is high. However, for temperatures of 750° C. and above, such self-supporting thin film, scandium-doped electrolyte offers satisfactory oxygen ions transport at reasonable costs.

According to one embodiment of the method of the disclosure for the combined production of electricity and nitric oxide, steam is the oxygen-containing gas introduced in the inlet of the cathodic side in step a), and hydrogen gas is collected at the outlet of the cathode. By producing hydrogen at the cathode, a useful fuel is generated that can be, for example, further used in the production of ammonia in a Haber-Bosch unit. Indeed, and as shown in FIG. 4, by producing hydrogen, additional ammonia can be produced (such as using Haber-Bosch unit) that can be fed as fuel to the anodic side of the cell. Therefore, the method cogenerates nitric oxide and hydrogen gas, which are needed in the production of nitric acid and ammonia respectively.

Furthermore, the use of steam as the oxygen-containing gas and the production of hydrogen gas are both functions being fulfilled in water electrolysis, using a water electrolyzer. This means that the method of the disclosure further allows for water electrolysis and that the system used in the method can be used not only as an SOFC, but also as a water electrolyzer upon using steam as the oxygen-containing gas. In addition, the respective use of steam and of ammonia as the feed gas at the inlet of the cathodic and anodic sides of an SOFC, makes it possible to produce hydrogen using less power than in a conventional electrolyzer: the oxygen gradient created by the feed of a gas at the inlet of the cathodic side that is richer in oxygen than the gas being fed in the inlet of the anodic side, results in a naturally driven flux of oxygen ions from the cathode to the anode, resulting in the production of hydrogen, nitric oxide and electricity.

In particular, when steam is used as the oxygen-containing gas, it is recommended to supply to the cell a voltage ranging from 0.5 to 0.6 V, in order to facilitate the flux of oxygen ions from the cathode, thereby facilitating the production nitric oxide on the anodic side.

In particular, steam is the oxygen-containing gas introduced in the inlet of the cathodic side in step a), hydrogen gas is collected at the outlet of the cathode, the oxygen containing gas introduced in the inlet of the cathodic side is alternated between air and steam, and the gas collected at the outlet of the anodic side alternates between oxygen-lean air and hydrogen, respectively.

Reference is made to FIG. 5. As mentioned above, the method of the disclosure further allows for water electrolysis and the system used in the method can be used not only as a solid oxide fuel cell but also as a water electrolyzer upon using steam as the oxygen-containing gas. As a reversible unit, the same unit is able to switch between fuel cell mode and electrolyzer mode simply by changing the feed on the cathode from air to steam. Such switch is possible since the cathode used is capable of handling both the strong oxidizing conditions upon supply of air and the strong reducing conditions upon production of hydrogen gas. A main challenge beyond water electrolysis in order to produce hydrogen gas without producing carbon dioxide is the dynamic load and intermittency, referred to as the flexibility, which means that the plant has to be started and stopped, according to the energy input—that is the green energy supplied, for example, by the sun or the wind. Due to limited flexibility of the plant, energy storage is needed, either as battery or as hydrogen storage as most realistic options, both which are very expensive. In addition, lower utilization of the electrolyzer makes the conventional concept quite expensive and reduces the lifetime of the electrolyzer, in particular when it is operated from 750 to 900° C. Now, with the method of the present disclosure, only ammonia and steam storage are required in order to simultaneously produce both nitric oxide and hydrogen; both ammonia and steam are relatively cheap and a constant load of nitric oxide is produced, independently on the fluctuations in the energy input. In addition, with the method of the disclosure, due to continuous production in the presence of ammonia storage, the degradation issues associated to high temperature water electrolyzers not being continuously operated are overcome: with the full utilization of the equipment of the plant, the operational costs are reduced.

In particular, air is the oxygen-containing gas introduced in the inlet of the cathodic side in step a), resulting in the production of oxygen-lean air at the outlet of the cathode, and the oxygen-lean air produced at the outlet of the cathode is fed to an air separation unit. In particular, a mixture of nitrogen gas and oxygen gas is the oxygen-containing gas introduced in the inlet of the cathodic side in step a), resulting in the production of a mixture of nitrogen gas and oxygen gas at the outlet of the cathode, with a reduced content in oxygen gas with respect to the mixture of gases introduced at the inlet of the cathode. This mixture of nitrogen gas and oxygen gas that is collected at the outlet of the cathode is fed to an air separation unit.

As mentioned above, by introducing air, following reduction in the cathodic side, a gas with a reduced oxygen content is obtained that can be fed to an air separation unit; as the oxygen content of the gas being fed to the air separation unit is reduced, less work will be required from the air separation unit to separate oxygen gas from nitrogen gas. In addition, the processing of air with a reduced oxygen content in an air separation unit will result in higher throughput of nitrogen gas to the Haber Bosch unit.

According to a second aspect of the disclosure, an SOFC for the combined production of electricity and substantial amounts of nitric oxide (NO) is disclosed. The SOFC comprises an anodic side comprising a solid gas-permeable anode, a gas inlet and a gas outlet; a source of ammonia gas in fluid communication with or connected to the gas inlet of the anodic side; a cathodic side comprising a solid gas-permeable cathode, a gas inlet and a gas outlet; a fully dense electrolyte, separating the anodic side from the cathodic side, in particular with a composition selected from (i) $Ce_{1-X}Gd_XO_{2-\delta}$ wherein X ranges from 0.1 to 0.2 and wherein $\delta$ ranges from 0.05 to 0.1, and (ii) $Zr_{1-(X+Y)}Sc_XM_YO_{2-\delta}$, wherein M is Al, Yb, Ce, wherein x ranges from 0.03 to 0.2 and wherein Y ranges from 0.001 to 0.01 and wherein $\delta$ ranges from 0.01 to 0.06.; and means for heating the SOFC to a temperature ranging from 500 to 800° C.; and means for collecting a current flowing between the anodic side and the cathodic side.

The cathode comprises a material suitable for reducing the oxygen in the oxygen-containing gas, and the anode comprises a composition $A_{1-X}A'_XB_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3.

In particular, the cathode comprises a composition $A_{1-X}A'_XB_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.25 to 0.3.

According to one embodiment of the SOFC of the disclosure, the anode and the cathode comprise a composition $La_{0.60}Sr_{0.40}Co_{0.20}Fe_{0.80}O_3$.

In particular, the composition of the electrolyte is $Ce_{1-X}Gd_XO_{2-\delta}$ wherein X ranges from 0.1 to 0.2 and wherein $\delta$ ranges from 0.05 to 0.1, and the means for heating the cell allow for heating to a temperature ranging from 500 to 750° C.

In particular, the electrolyte is $Zr_{1-(X+Y)}Sc_XM_YO_{2-\delta}$, wherein M is Al, Yb, Ce, wherein x ranges from 0.03 to 0.2 and wherein Y ranges from 0.001 to 0.01 and wherein $\delta$ ranges from 0.01 to 0.06, and the means for heating the cell allow for heating to a temperature ranging from 750 to 800° C.

Suitable sources of ammonia gas are known in the art. For instance, any ammonia container or ammonia reservoir may be used.

According to one embodiment of the SOFC of the disclosure, the SOFC further comprises means for reacting nitric oxide in fluid communication with the outlet of the anodic side.

According to one embodiment of the SOFC of the disclosure, the SOFC further comprises means for reacting nitric oxide in fluid communication with or connected to the outlet of the anodic side and the means for reacting nitric oxide is an oxidizing section of a nitric acid production unit being either supplied with an oxygen-containing gas or comprising an ammonia oxidation catalyst, wherein nitric oxide is oxidized to nitrogen oxide gases, in particular nitrogen dioxide and dinitrogen tetroxide.

According to one embodiment of the SOFC of the disclosure, the SOFC further comprises an oxidizing section of a nitric acid production unit being either supplied with an oxygen-containing gas or comprising an ammonia oxidation catalyst, wherein nitric oxide is oxidized to nitrogen oxide gases, in particular nitrogen dioxide and dinitrogen tetroxide, in fluid communication with the outlet of the anodic side, and a nitric acid absorption tower, wherein the nitrogen oxide gases produced in the oxidizing section are absorbed into an aqueous solution. With the SOFC of the disclosure, it is, therefore, possible to produce nitric acid without using an ammonia oxidation burner as in conventional nitric acid production units.

According to one embodiment of the SOFC of the disclosure, the outlet of the cathode is in fluid communication with or connected to an air separation unit.

According to a third aspect of the disclosure, a stack of SOFCs, comprising at least two or more of the cells of the disclosure, is disclosed. In particular, beyond the combination of SOFCs to obtain a stack of SOFCs, the person skilled in the art can straightforwardly combine stacks of SOFCs, such as to achieve the production of the necessary amounts of nitric oxide and electricity.

The stack may comprise for example 50 cells. It may be sealed, by melting a glass ceramic seal or welding metal supported cells. Once sealed, it cannot be opened or repaired if a single cell fails. In order to avoid issues such as high resistance in the entire stack, due to the delamination or coking of the electrode in a single cell only, it is necessary to ensure, as described above, that the components of the unit cell, in particular the electrodes, that is replicated to form a stack, are sufficiently resistant.

According to a fourth aspect of the disclosure, a system for the production of nitric acid is disclosed. The system comprises a Haber-Bosch unit with an outlet for collecting the ammonia produced by the unit; means for heating the ammonia produced by the Haber-Bosch unit to a temperature ranging from 500 to 800° C., such that ammonia is collected in a gaseous state at an outlet of the means for heating; an SOFC of the present disclosure, in particular a stack of SOFCs of the disclosure, wherein the inlets of the anodic sides of the cells are in fluid connection with or connected to the outlet of the means for heating ammonia; means for transferring the nitric oxide collected at the outlets of the anodic sides of the cells of the stack, to an oxidizing section of a nitric acid production unit being either supplied with an oxygen-containing gas or comprising an ammonia oxidation catalyst, wherein nitric oxide (NO) is oxidized to nitrogen oxide gases, in particular nitrogen dioxide and dinitrogen tetroxide; and means for transferring the nitrogen oxide gases to a nitric acid absorption tower, wherein the nitrogen oxide gases are absorbed into an aqueous solution, thereby producing nitric acid. In particular, the ammonia gas produced by the Haber Bosch unit is heated through a heat exchange system in which heat is provided from exothermic reactions in the ammonia production system to which the Haber Bosch unit belongs, or from the oxidizing section or from the absorption of the nitrogen oxide gases in the absorption tower. Thus, the system is made energy efficient and the heat recovered from the production of ammonia or nitric acid is used in heating the ammonia gas produced by the Haber Bosch unit to the necessary temperature for its conversion to nitric oxide in the solid oxide fuel cell.

In particular, a stack of SOFCs is used in the system of the disclosure for the production of nitric acid as this allows for the production of nitric acid on an industrial scale, producing from to 100 to 2800 tons of nitric acid per day. It is, nonetheless, evident to the person skilled in the art that the use of a single SOFC also results in the production of nitric acid.

Hence, by making use of the system producing both nitric oxide and hydrogen, the system of the disclosure allows for the combination of a high temperature water electrolyzer and an ammonia oxidation burner—that is the unit in a nitric acid plant in which ammonia is oxidized to nitric oxide—in a single unit. The oxidizing and absorption sections of a nitric acid plant are then further integrated, in order to produce nitric acid, from the nitric oxide produced from this single unit. Furthermore, as described above, an air separation unit can also be integrated, by recycling the oxygen-lean air at the outlet of the cathodic side to the air separation unit and energy will be saved in operating the air separation unit, as described above. Alternatively, it can be envisaged to use an air separation unit of a lower capacity.

In a particular embodiment, the system further comprises an ammonia combustor, located downstream of, hence in fluid communication with the outlets of the anodic sides of the cells of the stack, and means for transferring the gases collected at those outlets to the ammonia combustor. The ammonia combustor is designed to oxidize the ammonia not converted in the cells of the stack to nitric oxide. Indeed, as stated above, the ammonia not converted in the cells of the stack will be collected along with nitric oxide, at the outlets of the anodic sides of the cells of the stack. In order to minimize the losses of ammonia in the nitric acid production method and to increase the amount of nitric acid produced, the unconverted ammonia is oxidized to nitric oxide in the ammonia combustor. The ammonia combustor can comprise a well-known ammonia oxidation catalyst, such as a platinum-based catalyst or a perovskite-based catalyst. Alternatively, the ammonia combustor can comprise an oxide-based catalyst. In addition, the ammonia combustor may be equipped with means for being supplied with an oxygen-containing gas, such as oxygen, air or oxygen-enriched air. The gases resulting from the oxidation in the combustor are then transferred to the oxidizing section of the nitric acid plant and the system, therefore, further comprises means for achieving this transfer.

According to a fifth aspect of the disclosure, a method for producing nitric acid is disclosed. The method comprises the consecutive steps of a) producing ammonia in a Haber-Bosch unit; b) collecting the produced ammonia at an outlet of the Haber-Bosch unit; c) heating the ammonia produced by the Haber-Bosch unit to a temperature ranging from 500 to 800° C., such that ammonia is collected in a gaseous state at an outlet of the means for heating ammonia; d) transferring ammonia to the inlet of the anodic sides of the cells of the stack of SOFCs of the disclosure; e) producing nitric oxide according to the method of the disclosure for the combined production of electricity and nitric oxide; f) collecting the produced nitric oxide (NO) at the outlets of the anodic sides of the cells of the stack; g) transferring the produced nitric oxide to an oxidizing section of a nitric acid production unit being either supplied with an oxygen-containing gas or comprising an ammonia oxidation catalyst; h) oxidizing nitric oxide to nitrogen oxide gases, in particular nitrogen dioxide and dinitrogen tetroxide; i) transferring the nitrogen oxide gases to an absorption section of a nitric acid production unit; and j) absorbing the nitrogen oxide gases into an aqueous solution to produce nitric acid.

In particular, a stack of SOFCs is used in the method of the disclosure for producing nitric acid as this allows producing of nitric acid on an industrial scale. It is, nonetheless, evident to the person skilled in the art that the use of a single SOFC also results in producing nitric acid.

In a particular embodiment, the method further comprises the step of transferring the gases collected at the outlets of the anodic sides of the cells of the stack to an ammonia combustor. The method further comprises the step of oxidizing to nitric oxide, in the ammonia combustor, the ammonia not converted in the cells of the stack. The gases resulting from the oxidation in the combustor are then transferred to the oxidizing section of the nitric acid plant. Optionally, the method further comprises the step of supplying to the ammonia combustor, through the means for this supply, an oxygen-containing gas, such as oxygen, air or oxygen-enriched air. By supplying this oxygen-containing gas, the oxidation of ammonia in the ammonia combustor is improved.

According to a sixth aspect of the disclosure, the use of the SOFC of the disclosure, or the stack of SOFC's of the disclosure, for the combined production of electricity and substantial amounts of nitric oxide, is disclosed.

According to a seventh aspect of the disclosure, the use of an anode comprising a composition $A_{1-x}A'_xB_{1-y}B'_yO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr and V or mixtures thereof, X ranges from 0.05 to 0.6 and in particular from 0.1 to 0.4, Y ranges from 0 to 1 and $\delta$ ranges from 0.025 to 0.3, in the SOFC of the disclosure, in the stack of SOFC's of the disclosure, in the system of the disclosure for the production of nitric acid, in the method of the disclosure for the combined production of electricity and nitric oxide, or in the method of the disclosure for producing nitric acid, is disclosed.

EXAMPLES

Example 1

Materials

Cells of 20 mm diameter consisting of a self-supporting scandia-doped zirconia electrolyte (SSZ) with a thickness of 150 μm were produced. Both the anode and cathode were produced from a $La_{0.6}Sr_{0.4}Co_{0.2}Fe_{0.8}O_{3-\delta}$ mixed-oxide with a rhombohedrally distorted perovskite structure (LSCF).

A platinum anode, produced from a conducting platinum paste, was also produced for comparison purposes with the LSCF anode. After drying at 100° C., the anode was sintered for 2 h at 1150° C. Initial tests with a pure platinum paste anode showed very high cell resistances, which was assigned to pore adhesion of the platinum layer to the smooth electrolyte surface.

The cell performance was measured in a test unit consisting of an alumina tube, with an inner gas distribution tube and gold mesh and lead as a current collector for the anode. A second gold mesh and lead acted as a current collector for the cathode.

An alumina fixture allowed the cell to be uniformly compressed for sealing of the cell, and the cell was sealed by heating in a tube furnace for 12 h at 950° C. The fixture also contained a quartz tube allowing the flow of oxygen in argon over the cathode. The fuel gas, in our case diluted ammonia, was fed over the anode with the inner alumina tube. To improve electrical contact between the gold mesh current collector and the anode and cathode, a layer of gold paste was applied to the mesh and the electrodes.

Experimental Set-Up

Argon, oxygen and helium were supplied to the cathode Ammonia was supplied to the anode from a gas bottle containing 10% $NH_3$ in argon. After the cell, the gas from the anode was diluted further, to adjust the composition so that $NH_3$, NO, $NO_2$, $N_2P$ and $H_2O$ were within the calibrated ranges of an FTIR analyzer.

The conversion of ammonia and its oxidation selectivity to NO, $NO_2$ and $N_2O$, was established using a Gasmet CR4000 FTIR spectrometer. The gas lines between the cell anode and the FTIR analyzer, and the argon dilution gas, were trace heated to 180° C. to prevent condensation of acid. The FTIR analyzer was calibrated for $NH_3$, NO, $NO_2$ and $N_2O$ with calibration gas mixtures. An Agilent Technologies 490 Micro Gas Chromatograph was used to detect $O_2$ and helium in the exhaust from the anode to check that sealing of the cell had been successful.

A Gamry Reference 3000 potentiostat/impedance analyzer with ZView software, developed by Scribner Associates Inc, enabled determination of potential across cell as a function of current through the cell, and the generated power as a function of current through the cell.

Test Procedure

After sealing and leak testing, the cell was cooled from the sealing temperature of 950° C., to 700° C. After testing at 700° C., the cell temperature was increased to 750° C. for tests. At each test temperature, ammonia concentrations of 1 and 10% were used. Ammonia-argon gas flow rates varied from 9 ml/min up to 150 ml/min; with the lower flows reserved for the 10% ammonia-argon gas feed.

The current through the cell was controlled by the galvanostat. The LSCF-SSZ-LSCF cells had a sufficiently low resistance that with an oxygen potential gradient due to the oxygen-containing gas flow over the cathode and the ammonia-containing gas flow over the anode, an applied potential was not required to give an oxygen flux or current. Therefore cells produced electrical power.

A cell resistance of 1 $\Omega \cdot cm^{-2}$ was obtained at 800° C. This was sufficiently low for the cell to be operated as a fuel cell. A current 200 m $A/cm^2$ was applied to the cell prior to the admission of the ammonia-argon feed. This was to prevent over reduction of the anode before testing commenced. After this, flows of ammonia in argon were applied, and the current through the cell controlled by the galvanostat.

Results

Reference is made to FIG. 6. LSCF anode was able to achieve yields of NO up to 77% at 700° C., with power densities of 4 $mW \cdot cm^{-2}$. Testing of the cell with the platinum composite anode showed a high conversion of ammonia, but a very low selectivity towards our desired NO product: this was assigned to cracking of the ammonia on the Pt anode. Upon applying a voltage in order to obtain a current density greater than circa 55 $mA \cdot cm^{-2}$, a conversion of 15% only of the converted ammonia was converted into nitric oxide.

CONCLUSION

The performance of this platinum anode when operating in the fuel cell mode, is clearly inferior to the LSCF anode.

The invention claimed is:

1. A method for operating a solid oxide fuel cell (SOFC) for the combined production of electricity and a nitric oxide (NO) containing gas stream, comprising the steps of:
   a) providing an SOFC comprising an anodic side comprising a solid gas-permeable anode, a gas inlet and a gas outlet, a cathodic side comprising a solid gas-permeable cathode and a gas inlet and a gas outlet, and a fully dense solid electrolyte, separating the cathodic side from the anodic side;
   b) introducing an oxygen-containing gas in the inlet of the cathodic side of the SOFC;
   c) introducing an ammonia-containing gas stream in the inlet of the anodic side of the SOFC;
   d) collecting nitric oxide at the outlet of the anodic side, wherein nitric oxide represents at least 10% by weight of the NO containing gas stream collected at the outlet of the anodic side; and
   e) collecting a current flowing between the anodic side and the cathodic side;
   wherein the method is performed at a temperature ranging from 500 to 800° C., and wherein the anode comprises a composition $A_{1-X}A'_XB_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr, V and mixtures thereof, X ranges from 0.05 to 0.6, Y ranges from 0 to 1 and 0 ranges from 0.025 to 0.3, and wherein the cathode comprises a composition $A_{1-X}A'_X B_{1-Y}B'_YO_{3-\delta}$, wherein A is selected from the group consisting of La, Y, Sm, Pr, Nd and Gd, A' is selected from the group consisting of Ca, Sr and Ba, B and B' are each independently selected from the group consisting of Co, Fe, Mn, Cr, V and mixtures thereof, X ranges from 0.05 to 0.6, Y ranges from 0 to 1 and δ ranges from 0.025 to 0.3.

2. The method according to claim 1, wherein nitric oxide represents from 10 to 80%, of the product collected at the outlet of the anodic side.

3. The method according to claim 1, wherein the temperature ranges from 700 to 750° C.

4. The method according to claim 1, wherein the anode, the cathode or both comprise a composition $La_{0.60}Sr_{0.40}Co_{0.20}Fe_{0.80}O_3$.

5. The method according to claim 1, wherein the oxygen-containing gas is air, steam, oxygen, or a mixture of nitrogen and oxygen.

6. The method according to claim 1, wherein the method is performed at a temperature ranging from 500 to 750° C. and wherein the electrolyte is a cerium-based electrolyte.

7. The method according to claim 1, wherein the method is performed at a temperature ranging from 750 to 800° C. and wherein the electrolyte is a zirconia-based electrolyte.

8. The method according to claim 1, wherein the oxygen-containing gas introduced in the inlet of the cathodic side in step b) is steam, optionally alternated with air, and hydrogen gas, optionally alternated with oxygen-lean air is collected at the outlet of the cathode.

9. The method of claim 1 wherein in the anode composition X ranges from 0.1 to 0.4.

10. The method of claim 1 wherein in the cathode composition X ranges from 0.1 to 0.4.

11. The method of claim 6 wherein the electrolyte is $Ce_{1-X}Gd_XO_{2-\delta}$ wherein X ranges from 0.1 to 0.2 and wherein δ ranges from 0.05 to 0.1.

12. The method of claim 7 wherein the electrolyte is $Zr_{1-(X+Y)}Sc_XM_YO_{2-\delta}$, wherein M is Al, Yb, Ce, wherein x ranges from 0.03 to 0.2 and wherein Y ranges from 0.001 to 0.01 and wherein $\delta$ ranges from 0.01 to 0.06.

13. The method of claim 7 wherein the electrolyte is a 50 to 200 microns self-supporting membrane on the cathode or the anode.

14. The method of claim 8 wherein the oxygen lean air is fed to an air separation unit.

* * * * *